US009607281B2

(12) United States Patent
Lee et al.

(10) Patent No.: US 9,607,281 B2
(45) Date of Patent: Mar. 28, 2017

(54) METHOD AND APPARATUS FOR ACTIVATION AND DEACTIVATION OF AIRCRAFT CONTAINER TRACKING DEVICE

(71) Applicant: Senaya, Inc., Framingham, MA (US)

(72) Inventors: Brian Lee, Boston, MA (US); Mrinmoy Chakraborty, Bangalore (IN); Jamshed Dubash, Shrewsbury, MA (US); Jahangir Nakra, Titusville, NJ (US)

(73) Assignee: Senaya, Inc., Framingham, MA (US)

( * ) Notice: Subject to any disclaimer, the term of this patent is extended or adjusted under 35 U.S.C. 154(b) by 301 days.

(21) Appl. No.: 14/140,304

(22) Filed: Dec. 24, 2013

(65) Prior Publication Data
US 2014/0184804 A1 Jul. 3, 2014

Related U.S. Application Data

(60) Provisional application No. 61/747,537, filed on Dec. 13, 2012.

(51) Int. Cl.
G06Q 10/08 (2012.01)
G01S 19/14 (2010.01)

(52) U.S. Cl.
CPC .......... *G06Q 10/0833* (2013.01); *G01S 19/14* (2013.01)

(58) Field of Classification Search
CPC .............................. G01S 5/00; G06Q 10/0833
See application file for complete search history.

(56) References Cited

U.S. PATENT DOCUMENTS

| 6,281,797 | B1 | 8/2001 | Forster et al. |
| 6,734,796 | B2 | 5/2004 | Forster et al. |
| 7,501,944 | B2 | 3/2009 | Hyde |
| 7,791,455 | B1 | 9/2010 | MacLean, III et al. |
| 2008/0192129 | A1* | 8/2008 | Walker ............... G11B 27/034 348/231.2 |
| 2009/0061897 | A1 | 3/2009 | Hamilton et al. |
| 2009/0086025 | A1* | 4/2009 | Ngu ..................... C01B 3/32 348/159 |
| 2013/0096731 | A1* | 4/2013 | Tamari ............... G06F 11/3013 701/1 |

OTHER PUBLICATIONS

Georgiev et al., High Dynamic Range Image Capture with Plenoptic 2.0 Camera, 2010, Optical Society of America, pp. 1-3.*

(Continued)

*Primary Examiner* — Peter D Le
(74) *Attorney, Agent, or Firm* — Holzer Patel Drennan

(57) ABSTRACT

A tracking system that includes equipment and methodology to determine when the tracked container is in close proximity to an aircraft. In general, the tracking device is deactivated while the aircraft container is close to or on board of the aircraft, and the tracking device is activated while the aircraft container is outside the aircraft. The tracking system includes multiple machine vision sensors associated with the tracking device positioned on the container to identify the curvature associated with the container's surroundings. Activation and deactivation of the tracking device is associated with the information transmitted and received by the tracking device, based on various features of the geographic position of the container.

16 Claims, 5 Drawing Sheets

(56) References Cited

OTHER PUBLICATIONS

Wilburn et al. High-Speed Videography Using a Dense Camera Array, Stanford University, pp. 1-8.*
U.S. Appl. No. 13/796,574 (Chakraborty et al.) filed Mar. 12, 2013.
U.S. Appl. No. 13/796,683 (Lee et al.) filed Mar. 12, 2013.
U.S. Appl. No. 13/845,802 (Lee et al.) filed Mar. 18, 2013.
U.S. Appl. No. 13/906,804 (Lee et al.) filed May 31, 2013.

* cited by examiner

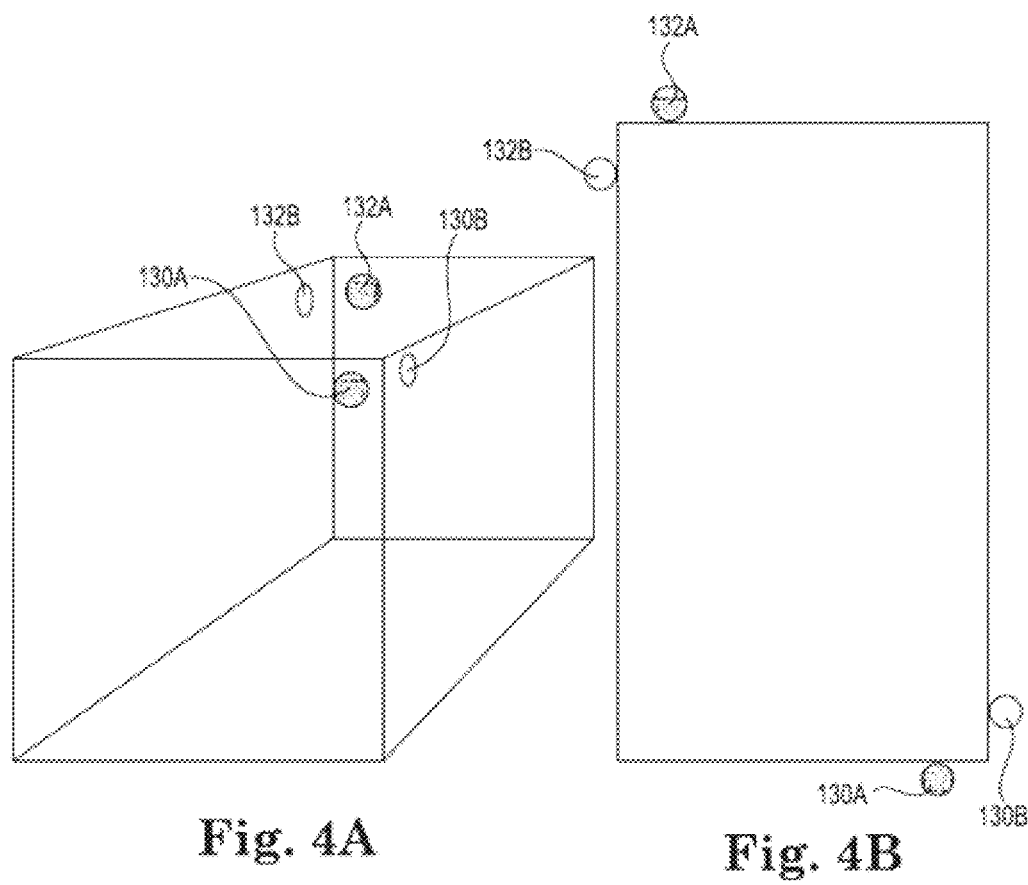

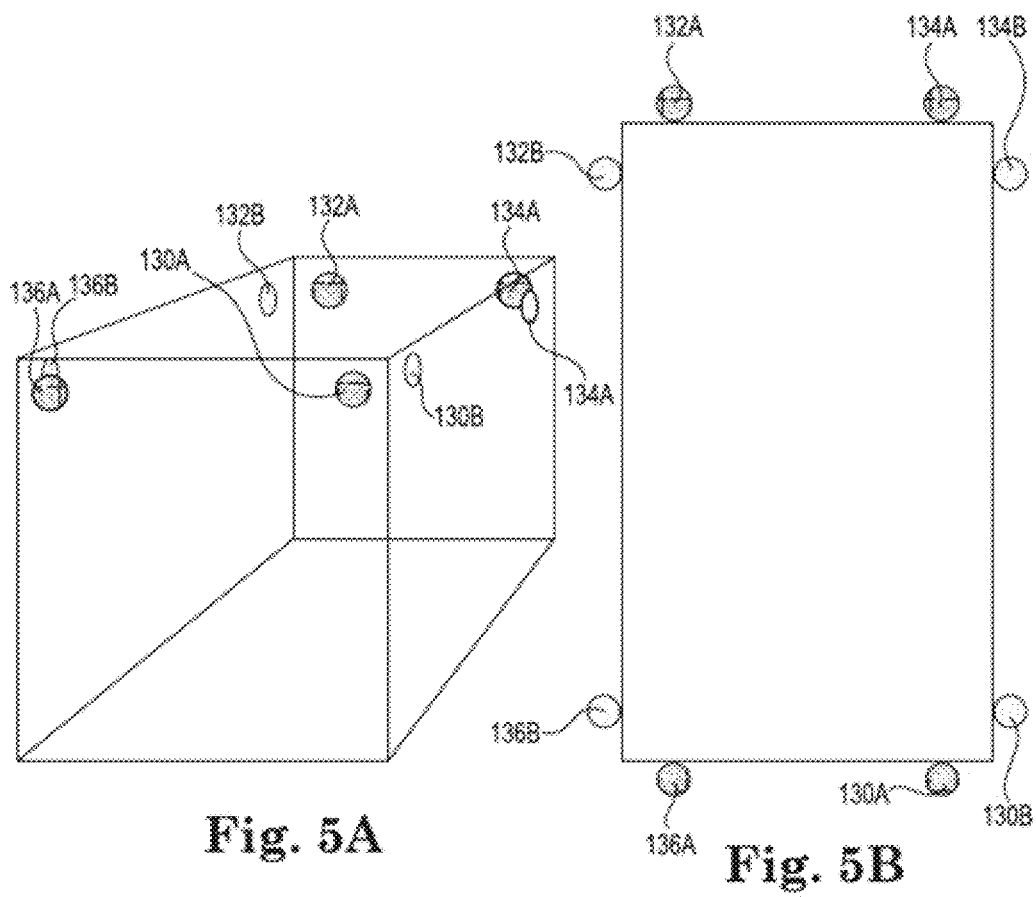

METHOD AND APPARATUS FOR ACTIVATION AND DEACTIVATION OF AIRCRAFT CONTAINER TRACKING DEVICE

CROSS-REFERENCE TO RELATED APPLICATION

This application claims the benefit of U.S. Provisional Application No. 61/747,537 filed Dec. 31, 2012, the entire contents of which are incorporated herein by reference for all purposes.

BACKGROUND

Many freight logistic companies attach tracking devices to aircraft containers to track their geographic location. This allows the logistic company to determine the geographic location of the container as it moves between the origination and destination points to determine whether the goods inside the container are on time, late, or might somehow be misplaced. For instance, the container may have been misrouted or been placed on the incorrect aircraft to reach its destination. The advantages of tracking the position of the goods are many and therefore have become commonplace throughout the shipping industry.

The tracking devices associated with the container transmit and receive various types of communication signals for determining the geographic position. A problem occurs when the container with the tracking device is loaded onto a transportation vessel, such as an aircraft, as the tracking signals may potentially cause interference with the aircraft systems. Regulatory agencies, such as the Federal Aviation Administration (FAA), have restrictions on communications signals due to their potential interference with flight systems and communications. Therefore it is necessary that the tracking device be deactivated while the aircraft container is on board the transportation vessel. Electronic devices may also cause undesired interference with other types of transportation vessels, in addition to aircraft, if such electronic devices are not deactivated or disabled.

Because aircraft do not include automatic detection systems that are capable of detecting when an electronic device having a field-emitting device is being used on the aircraft, the airlines rely on employees and other persons to ensure that electronic devices are not used in an improper manner. For example, passengers are requested to turn off all electronic devices that may cause interference with the aircraft systems in an unsafe manner, and flight attendants then visually inspect the passengers. This process has the goal of eliminating the possibility that a passenger may use a field-emitting electronic device while on-board the aircraft. Unfortunately, flight attendants cannot check the cargo hold, although other employees do. Still further, depending on the design of the transmitter on the cargo container, one unskilled in the area of tracking devices and systems probably cannot determine whether or not a tracking device is active or inactive. Thus, the airlines depends on the tracking device system and the personnel using it and responsible for it.

It has been determined that it is inadequate to rely on manually switching 'off' the tracking device when it enters the aircraft. For instance, human operators may forget to deactivate the tracking device when the container is entered into the transportation vessel. Additionally, these containers are normally tightly packed into the transportation vessel cargo hold in such a manner that they are not easily accessible once the transportation vessel has been completely loaded. One container with a tracking device still activated that is loaded onto a transportation vessel may require that the entire transportation vessel be unloaded to access and deactivate the tracking device. Further, once the container is removed from the transportation vessel at the end of its journey, the tracking device must be reactivated so the container can again be adequately tracked. To eliminate these problems, the tracking device of the present invention can automatically deactivate itself when located in the airplane cargo hold.

U.S. Pat. No. 6,281,797 describes tracking devices that use detection of frequency signals to indicate the proximity of a transportation vessel and thereafter automatically deactivate a field-emitting device and/or a tracking device associated with an electronic device and/or a shipping container. However, a problem may occur if the frequency detector fails to operate properly and detect a transportation vessel due to a malfunction or other error. If the frequency detector fails, the field-emitting device and/or the container will not deactivate its field-emitting and/or tracking device systems, thereby potentially interfering with the transportation vessel systems.

SUMMARY

The present disclosure provides a method and apparatus for autonomous sensing of the presence of operational aircraft in close proximity to an airline container that has a tracking device. Control circuitry present in the tracking device drives to activate, deactivate or otherwise modify the performance of the tracking device while in the close or immediate vicinity of the aircraft. In general, the tracking device is deactivated while the aircraft container is on board of the aircraft, and the tracking device is activated while the aircraft container is outside the aircraft. In some embodiments however, the tracking device is deactivated if the container is within a predetermined radius outside of the aircraft.

The tracking system includes multiple machine vision sensors associated with the tracking device, yet physically separate from the device, positioned on the container to identify the curvature associated with the container's surroundings; the sensors are preferably positioned 90 degrees to each other. Activation and deactivation of the tracking device is associated with the information transmitted and received by the tracking device, based on the environmental (e.g., physical) features surrounding the container.

One particular embodiment of this disclosure is a wireless tracking system for a cargo container. The tracking system has a wireless tracking device comprising a GPS/GLONASS system, an RF communication module or a cellular phone module configured to transmit information to a remote receiver, and a control system. The system also has a pair of machine vision image sensors, one being a principal image sensor and the other an auxiliary image sensor, the principal sensor and auxiliary sensor having a 90-degree angle between each other, the control system adapted to receive the information from the pair of sensors.

Another particular embodiment of this disclosure is a wireless tracking system associated with a cargo container, with the tracking system having a tracking device comprising a GPS/GLONASS system for receiving positioning information of the cargo container, an RF communication module or a cellular phone module adapted to receive the positioning information and transmit the positioning information to a remote receiver, and a control system. The tracking system also has a pair of machine vision sensors present on the cargo container with a 90-degree angle between each other, the sensors configured to sense physical details regarding the surroundings of the cargo container and transmit information to the control system.

Yet another particular embodiment of this disclosure is a method of deactivating a tracking device associated with a container, such as an aircraft container, when the container is within proximity to the transportation vessel, such as an aircraft. The method comprises the steps of associating a wireless tracking device with the container, associating at least one pair of machine vision sensors with the container, sensing with the pair of sensors when the container is in proximity to the transportation vessel, and deactivating the tracking device when the container is in proximity to the transportation vessel. The step of sensing with the pair of sensors may comprise sensing curvature, such as a cargo hold or door, associated with the transportation vessel.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which:

FIG. 4A is a schematic perspective view of a machine vision system having two pairs of sensors; FIG. 4B is a schematic top view of FIG. 4A.

FIG. 5A is a schematic perspective view of a machine vision system having four pairs of sensors; FIG. 5B is a schematic top view of FIG. 5A.

DISCUSSION OF THE INVENTION

Figure 1:
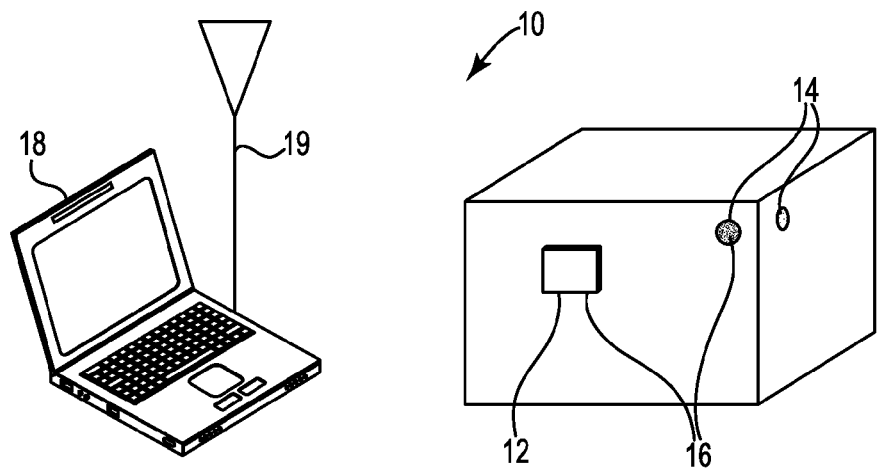
FIG. 1 is a schematic diagram of a wireless tracking system including a tracking device, a receiver and sensors.

A wireless tracking system is highly beneficial in knowing the physical location of an asset at a set point in time. A "tracking system" and variations thereof includes at least one tracking or transmitter device, and a receiver for receiving the location signal from the tracking transmitter device(s). A "tracking device," "transmitter device," and variations thereof is a portable, signal emitting device configured for placement in or on an asset to be tracked, such as a container of goods. A tracking device, together with its associated sensor(s), forms a "tracking module". FIG. 1 illustrates a tracking system 10 comprising a tracking device 12 positioned on a cargo container. Such containers can also be referred to as a unit load device (ULD). Also positioned on the cargo container, separate from device 12, are at least two machine vision sensors 14. Together, tracking device 12 and sensors 14 form a tracking module 16. Tracking device 12 includes wireless communication elements therein to allow it to transmit to receiver 18, illustrated as a computing device in this embodiments, via RF or other signals received via antenna 19. Additional details regarding tracking device 12, sensors 14, and overall system 10 are provided below.

Tracking is particularly beneficial for aircraft cargo, as it is not uncommon for cargo to be moved several times prior to be loaded on to the aircraft for its transport. Additionally, unlike over-the-road cargo, which can be quickly retrieved if placed on the wrong truck, an aircraft cargo container, if loaded on the wrong aircraft, will typically not be retrieved for an extended time period, because typically the aircraft will not be recalled or make an unscheduled landing merely because of one erroneously loaded container. When at the incorrect destination, the container will have to wait to find a return flight or an alternate flight to its desired destination. Because of the larger possibility of lost aircraft cargo containers, it is particularly desirable to know the immediate location of these containers.

Prior to this invention, many tracking devices for containers, such as aircraft containers, utilized Global Position System (GPS), together with a combination of ultra-sound sensors, light sensors, and accelerometer sensor(s). These prior tracking devices and systems are limited to the availability of GPS, and many false negatives and false positives are generated due to variations of aircraft engine operation and environment. This disclosure provides tracking devices and systems that are independent of the availability of GPS signal, provide fault-free on-off operation to comply with FAA regulations, are independent of variation of aircraft engine operation, and are independent of environmental conditions.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

As indicated above, the present invention is directed to a tracking device for a container for shipping of goods and/or materials. To eliminate the possibility of human error, the tracking device is automatically deactivated when in predetermined proximity to a transportation vessel, such as an aircraft, so that its emitted signals do not interfere with a transportation vessel while a container associated with the tracking device and/or field-emitting device is proximate to or on board the transportation vessel. The tracking device is associated with sensors that provide determination if the container is proximate to, being loaded into, or already loaded in to (hereinafter, collectively referred to as "proximate") a transportation vessel. Together, the tracking device and sensors form a tracking module. If the tracked container is proximate to the transportation vessel (e.g., aircraft) the tracking device can be deactivated so as to not interfere with the communications systems of the transportation vessel.

As a further consideration, the tracking device and sensors must be installed on the aircraft container such that it does not interfere with cargo handling equipment. This includes placement of both the transmitting device and its associated sensors in a location such that neither the cargo handling equipment nor a turbulent ride can readily damage the equipment.

Another consideration, the tracking device must be powered in harsh environment, and has its own power system so that the tracking device does not rely on the AC main power, as in a battery-powered device. As a benefit, the tracking device can also deactivate other systems to conserve power and to further diminish potential interference with the transportation vessel's systems.

To accurately determine the point of deactivation and/or reactivation of the tracking device once it has been loaded an/or unloaded onto a transportation vessel such as an aircraft, the tracking devices is associated with an array of sensors that are positioned on the cargo container.

There are many ways in sensing that the container is in close proximity to a transportation vessel, any of which can act independently or in conjunction or coordination with each other to deactivate the tracking device. Environmental sensors may be used to sense information concerning the surrounding of the container, including but not limited to, reception of positioning information, acoustics, frequencies, pressure, altitude, motion, vibration, capacitance, and imaging. Cooperative marker sensors may also be used by placing them in close proximity to the transportation vessel in strategic locations such that sensors associated with the container are able to read such markers to determine that the container is proximate to a transportation vessel so that the tracking device can be deactivated. These sensors are also used to determine when the container is no longer proximate to a transportation vessel so that the tracking device can be reactivated.

Figure 2:
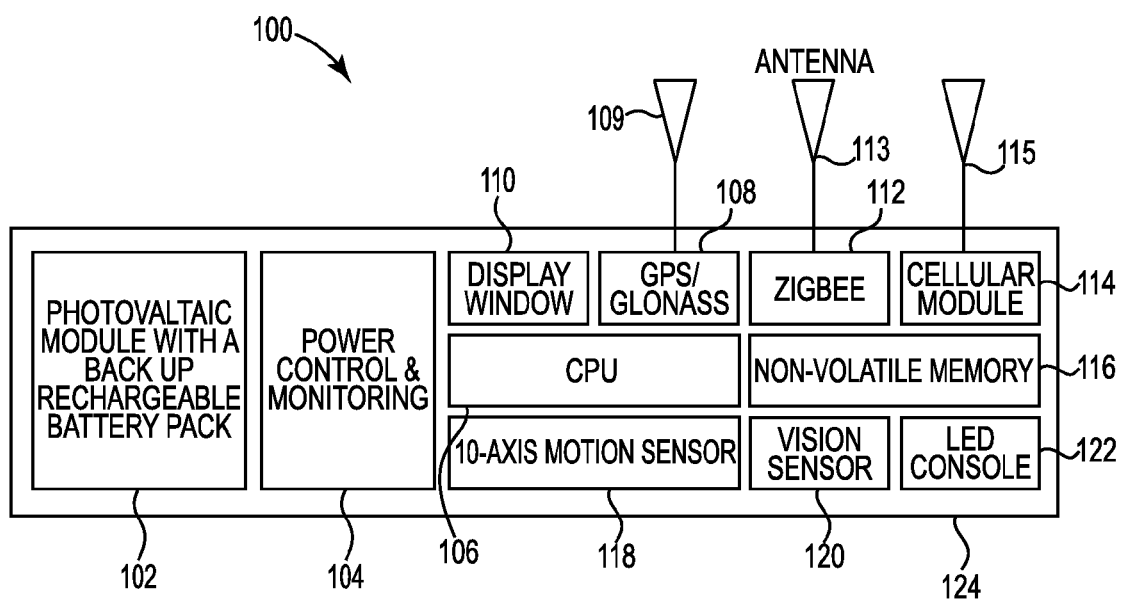
FIG. 2 is a schematic block diagram of a wireless tracking device.

Turning to the figures, a particular embodiment of a tracking device (such as tracking device 12 of FIG. 1) is illustrated in FIG. 2. Tracking or transmitter device 100 of FIG. 2, together with a receiver (e.g., receiver 18 of FIG. 1) and associated sensors (e.g., sensors 14 of FIG. 1), forms a tracking system (e.g., system 10 of FIG. 1). The particular device 100 has automatic on-off capabilities, to comply with FAA regulations. Transmitter device 100 is configured to deactivate and reactivate depending on its position, such as in relation to an aircraft. FIG. 2 and the following discussion are directed to one particular wireless tracking device. It is understood that other configurations and designs of the tracking device may be used in conjunction with the machine visions sensors to form the tracking module.

Device 100 includes a power source 102, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 1, power source 102, which can be a photovoltaic module and optionally include a rechargeable battery pack. Other power source rechargers or regenerators could be utilized, such as an inductive coil, a USB power-line, and mechanical energy harvesting mechanisms.

Electrically connected to power source 102 is a power control module 104 that includes a power level (e.g., battery level) monitor and a power control, which in turn is operably connected to a computer chip or CPU 106. Together CPU 106 and power module 104 activate and deactivate various elements of device 100, based on physical location of device 100. Transmitter device 100 also includes a positioning element, in this embodiment a GPS/GLONASS positioning element 108 connected to an antenna 109, which may be an internal antenna or an external antenna, and may be embedded into a housing encasing the elements of device 100. Antenna 109 may be, for example, a planar inverted F antenna, an inverted L antenna, or a monopole antenna. Antenna 109 may be a multi-band antenna, one that can transmit and receive signals in multiple frequency bands. Positioning element 108 provides data to transmitter device 100 regarding its physical location.

Transmitter device 100 transmits information or data, such as its location, in the form of a "ping" to the remote receiver (e.g., receiver 18 of FIG. 1) via a wireless network; the information or data may also be provided to a display 110 on device 100. In some embodiments, transmitter device 100 has two-way communication with the receiver. That is, transmitter device 100 transmits information (i.e., a ping) and also receives information from the receiver. Further, transmitter device 100 may receive instructions, such as to acknowledge that device 100 is active and ready and to transmit the location information. Having received those instructions, device 100 can send back to the receiver acknowledgement that the communication was received and acted on.

As indicated, the transmitter device is configured to send and optionally receive data via a wireless network. Device 100 of FIG. 2 is configured with a ZigBee module 112 to connect to the receiver via a ZigBee network and communicate data (e.g., position data). An alternate embodiment of a transmitter device can utilize a ZigBee/LBT module and a corresponding ZigBee/LBT network. Additionally, transmitter device 100 may include a data receiver (not shown), such as an infra red data link (IrDA), to provide a second communication means to device 100, as an alternate or back-up to module 112. Device 100 also includes a cellular communication module 114, which may be CDMA (Code Divisional Multiple Access) and/or GSM (Global System for Mobile Communication) module, configured to connect to the receiver via either a CDMA or GSM network and communicate data to the receiver.

Communication modules 112, 114, respectively, have an antenna 113, 115 which may optionally include a power amplifier to extend the range of the signal from modules 112, 114. In some embodiments, modules 112, 114 may be combined into a single physical module rather than two separate or distinct modules. Together, modules 112, 114 provide the communication basis for transmitter device 100 to the receiver. Module 112, which connects device 100 a wireless RF network, can be utilized when FAA regulations allow use of RF communications, and module 114, which connects device 100 to a cellular network, can be utilized when FAA regulations do not allow the use of RF communications yet do allow cellular communications.

Any of the data or information regarding device 100, such as its position as determined by positioning element 108, alarm information, battery level information, etc., can be stored in a memory 116 of device 100, which may be a permanent memory or a rewritable memory. Data from memory 116 may be transmitted to the receiver or may be retained in memory 116 until manually retrieved.

Transmitter device 100 includes a motion sensor array 118 to determine the orientation, location and/or movement of device 100. Separate from or incorporated into motion sensor array 118 may be a machine vision sensor 120; this vision sensor 120 is separate from the ones present on the cargo container, i.e., sensors 14 in FIG. 1. Motion sensor array 118 can be, for example, a three degree of freedom (DOF) device that has a 3-axis accelerometer or can be a six degree of freedom (DOF) device that includes a 3-axis gyroscope and a 3-axis accelerometer. Other examples of suitable configurations for motion sensor array 118 include a 9-DOF device that includes a 3-axis gyroscope, a 3-axis accelerometer and a 3-axis magnetometer, and a 10-DOF device, as illustrated in FIG. 2, that includes a 3-axis gyroscope, 3-axis accelerometer, 3-axis magnetometer, and an altitude sensor. Other embodiments of motion sensor array 118 may be used. With the various multiple degrees of freedom, device 100 can distinguish among various movements, orientations and locations, such as lateral motion, acceleration, inclined or declined motion, and altitude. With this information, device 100 can determine its status and relate that to the aircraft's status, e.g., idle, taxiing, take-off, cruising at altitude, landing, etc., if device 100 is attached to an aircraft cargo container.

Device 100 may also include an indicator console 122 having various operational switches, gauges, buttons, and/or lights (e.g., LED lights). Console 122 may include any number of optional features, such as an audio alarm to indicate any number of problems or malfunctions, such as low battery level, unauthorized movement (as sensed by motion sensor array 118 and/or vision sensor 120), or tampering with device 100.

The various elements that compose transmitter device 100 may be housed in an RF and/or cellular transmissive enclosure or housing 124, preferably one that is at least water resistant. At least a portion of housing 124 may be transmissive or transparent to RF and/or to visible light.

Device 100 can be placed into or on a cargo container and used to track the location of that container and transmit its position to a remote receiver. Alternately, device 100 may be formed into the wall of a cargo container, thus being integral with the container. Of course, other tracking devices and methodology can be used in conjunction with the machine visions sensors, as per the present disclosure, including those tracking devices described in U.S. Pat. No. 9,355,381, U.S. Pat. No. 9,020,527, U.S. Pat. No. 9,253,752, and U.S. patent application Ser. No. 13/906,773 filed May 31, 2013 titled "Wireless Device with Hybrid Energy Charging."

Tracking device 100 has at least one pair of machine vision sensors associated with device 100 yet physically separate from device 100. As shown in FIG. 1, tracking device 12 is positioned on a cargo container together with sensors 14; together device 12 and sensors 14 form tracking module 16. Sensors 14 determine the container's surroundings; in some embodiments, sensors 14 are particularly adapted to distinguish curvature of the surroundings. Some cargo holds for certain aircraft have shapes unique to cargo holds to the aircraft's construction and design, and, thus, identifiable curvatures. By using machine vision sensors to identify the curvature associated with the container's surroundings; a door of the aircraft for example, the tracking device can determine whether the container is proximate to the aircraft so that the tracking device can be deactivated. In some embodiments, sensors 14 provide a self-checking feature to device 100, over than of motion sensor array 118 and vision sensor 120, to detect and determine the device's location in relation to an aircraft, and thus disable any electronic field-emitting and/or tracking device so that it does not interfere with the aircraft communication systems, per FAA regulations.

The machine vision sensors 14 have a high dynamic range (HDR>120 dB), high frame rate (at least FRS>100 frame per second, in some embodiments FRS>120 or even>140), and a global shutter (to minimize smearing and distortion of images). The sensors are CMOS Image Sensors, preferably with VGA resolution video capabilities, to capture a movement event, such as the entrance and exiting event of a container from an airplane door. The sensors can be referred to as low cost CMOS image sensors, a phrase which is known to those in the field of sensors and which are readily commercially available, such as from IHS GlobalSpec of East Greenbush, N.Y.

Preferably the vision sensors have a UV protected lenses with Infra-Red (IR) sensing capability for night vision detection. In some embodiments, the sensors also function as a light sensor to detect indoor light. The vision sensor is equipped with an auto-focus and anti-shaking frame. An image processing capability is integrated with the vision sensor.

Figure 3A:
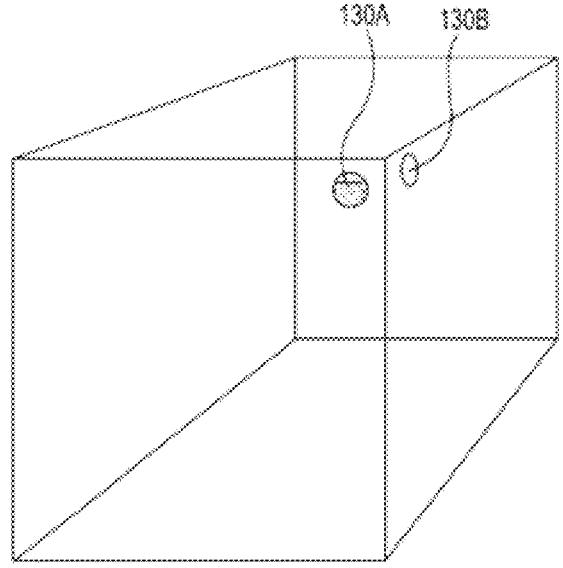
FIG. 3A is a schematic perspective view of a machine vision system having a pair of sensors.
Figure 3B:
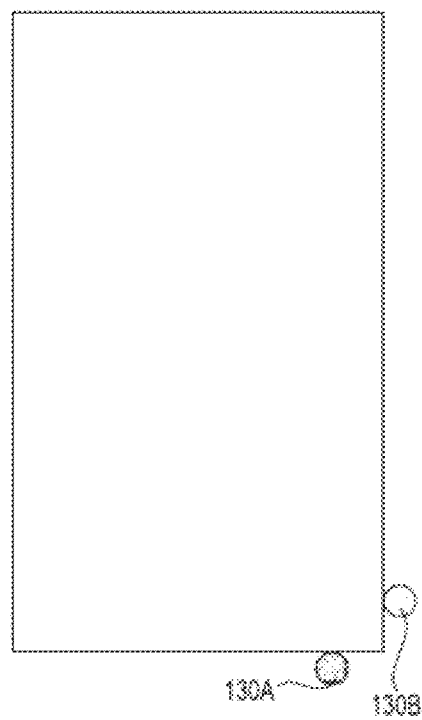
FIG. 3B is a schematic top view of FIG. 3A.

In one embodiment, the machine vision system consists of two CMOS image sensors, or, a pair of sensors, one principal and one auxiliary. In FIGS. 3A and 3B, a cargo container or unit load device (ULD) is schematically shown having a principal sensor 130A mounted at the front and an auxiliary sensor 130B at the side of the container, creating a pair of vision sensors with 90 degree angle between one to the other. Both sensors 130A, 130B are preferably mounted in recessed compartments. Using two vision sensors, oriented at 90 degrees, creates an error-proof mechanism to "see" the curvature of the container's surroundings, and make a determination whether the container is proximate to a curvature that represents a transportation vessel so that the tracking device can be deactivated.

In another embodiment, the machine vision system consists of four CMOS image sensors as shown in FIGS. 4A and 4B; two principal sensors 130A, 132A and two auxiliary sensors 130B, 132B. Principal sensors 130A, 132A are mounted at the front and the back of the container, and positioned diagonally across the container to each other. Similarly, auxiliary sensors 130B, 132B are mounted at the sides of the container, and positioned diagonally to each other. To reduce power consumption, the sensors can be configured so that only one pair of the CMOS image sensors, e.g., 130A and 130B, are ON, the other pair of the CMOS image sensors, e.g., 132A and 132B, being OFF. Switching ON and OFF of the CMOS image sensor pairs is determined by the direction of movement of the container. The direction of the container may be determined by an accelerometer, such as a dedicated one or one that is incorporated into the associated tracking device, e.g., device 100.

In another embodiment, the machine vision system consists of four pairs of CMOS image sensors as shown in FIGS. 5A and 5B. Two pairs 130A, 130B and 132A, 132B are main vision sensors as described in the previous embodiment of FIGS. 4A and 4B, and another two pairs 134A, 134B and 136A, 136B are back-up vision sensors, for redundancy. Similarly, as in the previous embodiment, the sensors can be configured so that only one pair is ON at a time, with the other pairs OFF. A fault mechanism is built in to the system so that if the main sensor pair is non-operational or their view is obstructed, the second, third or fourth pair will activate.

In each of the embodiments, vision sensors 130A, 130B, 132A, 132B, etc. are recessed into a vertical side wall of the container looking straight ahead (preferably in the horizontal direction) and not looking upwards in a vertical direction, which would have a tendency to accumulate dust and debris on the visions sensor and impede its vision. Additionally, being recessed into a vertical sidewall protects the sensors when multiple containers are vertically stacked and/or arranged side-by-side. For embodiments where positioning on a vertical sidewall is not possible, a sensor may be positioned on a sloping slide wall and/or under a protective ledge of the like. It is preferred that a sensor not be positioned on a horizontal surface.

In each of the embodiments, each of vision sensors 130A, 130B, 132A, 132B, etc. has a relatively long field of view (FOV) and limited exposure, which reduces the probability of image distortion or false detection. Further, vision sensors 130A, 130B, 132A, 132B, etc. are preferably protected by a physical cover, such as a metallic housing, that may be part of the container itself or an additional housing or chassis. In general, sensors 130A, 130B, 132A, 132B, etc. are equipped with a micro-lens that is covered by an optically transparent and UV protected industrial quality glass or quartz having a small aperture (e.g., ⅛ inch diameter). A high aspect ratio (e.g., at least 4:1) of thickness of the lens to aperture diameter ensures a structural strength of the optical device.

In one embodiment, a mechanical shutter, similar to that used in automotive, aerospace and consumer applications, is incorporated into the vision sensor(s) to prevent potential damage from direct exposure from sunlight, mechanical debris and dust. This mechanical on/off shutter is generally closed, so as to avoid direct exposure to sunlight, such as during a sleep mode of the sensors.

In one embodiment the vision sensors use only black and white images and increase the fill factor by >30% providing more signal to noise ratio (SNR). Because machine vision (unlike human vision) only recognizes "image patterns" rather than the precise image itself, machine visions sensors are essentially immune to imaging complications due to lighting, weather, or other environmental conditions.

Returning to FIG. 2, as indicated, this container-tracking device 100 is equipped with 10-axis motion sensor array 118 and vision sensor 120. Motion sensor array 118 can be used to wake up vision sensor 120 and/or associated vision sensors 130A, 130B, etc. Motion sensor array 118 can additionally or alternately provide secondary information regarding movement of the container, such as being lifting onto a conveyer, ramping onto an aircraft, ascending, descending, landing, take off, touchdown, taxi, etc. In the unfortunate occurrence that vision sensors 130A, 130B, etc. fail under extreme conditions, motion sensor array 118 acts as a back up, detecting and notifying if the container is proximate or in an aircraft or otherwise in a location that field-emitting communication is regulated. For occurrence when motion sensor array 118 takes over, vision sensors 130A, 130B, etc. may function as light sensors, detecting and determining a light source. This information regarding light can be used for decision making regarding activation and deactivation of device 100.

Vision sensors 130A, 130B, etc. are usually in a sleep mode to save power and are woken up when a movement above a threshold level is detected by motion sensor array 118. The motion threshold may be based on a combination of motions, such as a lateral motion followed by a vertical (or sliding up) motion, which is typical of a loading event. A combination of motions, rather than a single motion, reduces activations due to false positives.

The tracking device 100, together with the CMOS vision sensor pair(s) 130A, 130B, 132A, 132B, etc., is used to track the location of the tagged container via wireless RF and/or cellular communication. The data or "ping" protocol may be time based, event based, or an event identified as a SMART Ping™ protocol such as described in U.S. Pat. No. 9,355,381, U.S. Pat. No. 9,020,527, U.S. Pat. No. 9,253,752, and U.S. patent application Ser. No. 13/906,773 filed May 31, 2013 titled "Wireless Device with Hybrid Energy Charging," all which are incorporated herein by reference in their entirety.

FIG. 5 illustrates an example of a state diagram for loading events, such as into an aircraft. Initially, the device (e.g., device 100 or device 12 of FIG. 1) is in a sleep state. The device will go to wake-up state when movement is detected, for example, by motion sensor array 118. If the machine vision module (e.g., device 100 and sensors 130A, 130B, etc.) detects a door of the aircraft, the device goes to idle state. Here after, the device will check if a timer has expired. When the timer has expired, the device will go to a ping state, where the device sends a ping to its receiver (e.g., receiver 18 of FIG. 1). When a wireless transmission system, e.g., CDMA or ZigBee or WiFi, is unavailable for the device to send its data, the message will be saved in an internal memory (e.g., memory 116) of the device for later use. Hereafter, the device will go to sleep mode.

Figure 6:
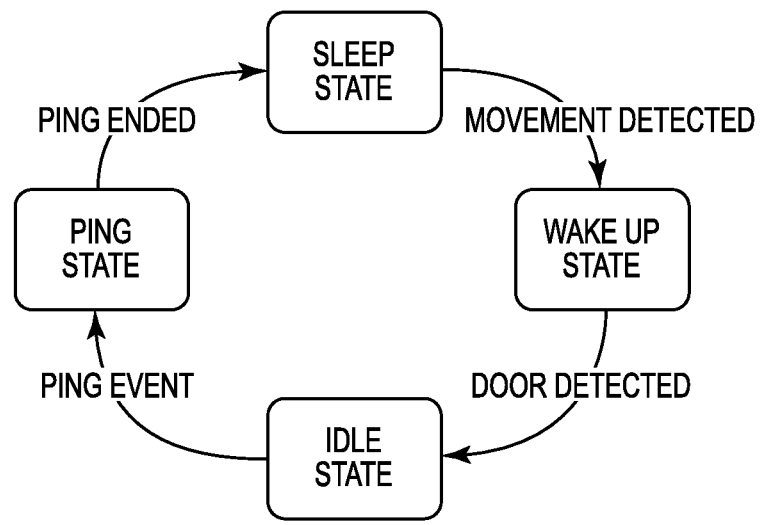
FIG. 6 is a state diagram for the tracking device.
Figure 7:
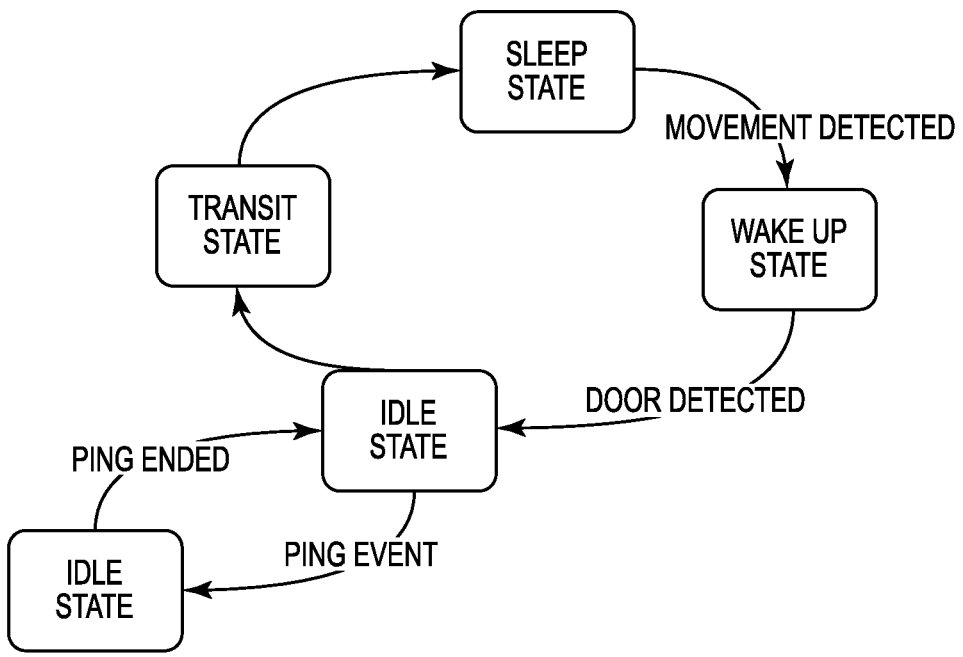
FIG. 7 is a state diagram for unloading from an aircraft.

FIG. 6 illustrates an example of state diagram for unloading events, such as from an aircraft. Initially, the device (e.g., device 100 or device 12 of FIG. 1) is in sleep state. The device will go to wake-up state when movement is detected. If the machine vision module (e.g., device 100 and sensors 130A, 130B, etc.) detects a door of the aircraft indicating the container leaving the aircraft, the device goes to idle state. Here after, the device will check if a timer has expired. When the timer has expired, the device will go to a ping state, where the device sends a ping to its receiver. When a wireless transmission system, e.g., CDMA or ZigBee or WiFi, is unavailable for the device to send its data, the message will be saved in an internal memory (e.g., memory 116) of the device for later use. When motion sensors of the device (e.g., sensor array 118) observe a sequence of movements within a predetermined time, the device will go into a transit state. Once the device is in the transit state, it goes immediately into sleep mode without enabling the motion sensors (e.g., sensor array 118) in order to preserve the battery. In some embodiments, the device will wake up at predetermined intervals to enable the motion sensors to check if the transit is finished. The device goes to the sleep state when no activity is observed.

Thus, various embodiments of the METHOD AND APPARATUS FOR ACTIVATION AND DEACTIVATION OF AIRCRAFT CONTAINER TRACKING DEVICE are disclosed. For example, disclosed is a motion sensor arrangement associated with a tracking device comprising at least one principal image sensor, at least one auxiliary image sensor, with the principal sensor and auxiliary sensor mounted with a 90-degree angle between one to the other, and optionally, where both sensors are mounted in recessed compartments. Also disclosed is a method of deactivating a tracking device associated with a container, comprising the steps of: (a) associating a tracking device with the container; (b) sensing when the container is in proximity to the transportation vessel; and (c) deactivating the tracking device when the container is in proximity to the transportation vessel. Also disclosed is a tracking device, for use with a separate motion sensor arrangement, the tracking device having a GPS/GLONASS system for receiving positioning information of the cargo container, a cellular phone modem adapted to receive the positioning information and transmit the positioning information to a remote site, a sensor operatively associated with the cargo container to sense information concerning the surroundings of the cargo container, and a control system adapted to receive the information from the sensor to deactivate the cellular phone modem when the cargo container is in proximity to the vessel. A similar tracking device may have an RF module adapted to receive the positioning information and transmit the positioning information to a remote site.

The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A wireless tracking system for a cargo container comprising:
    (a) a wireless tracking device comprising a GPS/GLONASS system, an RF communication module or a cellular communication module configured to transmit information to a remote receiver, and a control system; and
    (b) a pair of machine vision image sensors physically separate from the wireless tracking device, one being a principal image sensor and the other an auxiliary image sensor, the principal sensor and auxiliary sensor having a 90-degree angle between each other;
    wherein the pair of machine vision sensors identifies a curvature associated with surroundings of the cargo container, and
    wherein the tracking device thereby determines whether the tracking device is proximate to the curvature for being deactivated.

2. The tracking system of claim 1 further comprising a second pair of machine vision image sensors, one being a principal image sensor and the other an auxiliary image sensor, the principal sensor and auxiliary sensor having a 90-degree angle between each other.

3. The tracking system of claim 2 further comprising a third pair of machine vision image sensors and a fourth pair of machine vision sensors.

4. The tracking system of claim 1 wherein the machine vision image sensors have a high dynamic range (HDR>120 dB), a high frame rate (FRS>100), a global shutter, and are a low cost image sensor.

5. The tracking system of claim 1 wherein the tracking device further comprises a motion sensor array having ten degrees of freedom.

6. The tracking system of claim 1 wherein the tracking device further comprises a battery, memory, and a motion sensor array having ten degrees of freedom, and a machine vision sensor.

7. A wireless tracking system associated with a cargo container, the tracking system comprising a tracking module having:
    (a) a tracking device comprising
        (i) a GPS/GLONASS system for receiving positioning information;
        (ii) an RF communication module or a cellular communication module adapted to receive the positioning information and transmit the positioning information to a remote receiver; and
        (iii) control circuitry; and
    (b) a pair of machine vision sensors physically separate from the tracking device and present on the cargo container with a 90-degree angle between each other, the sensors configured to sense curvature associated with the surroundings of the cargo container,
    the control circuitry configured to deactivate the tracking device when curvature is associated with the surroundings of the cargo container.

8. The tracking system of claim 7 wherein the machine vision sensors are present on sidewalls of the cargo container.

9. The tracking system of claim 8 further comprising a second pair of machine vision image sensors present on the cargo container with a 90-degree angle between each other and diagonally across from the pair of machine vision image sensors.

10. The tracking system of claim 9 further comprising a third pair of machine vision image sensors present on the cargo container with a 90-degree angle between each other, and a fourth pair of machine vision image sensors present on the cargo container with a 90-degree angle between each other.

11. The tracking system of claim 8 wherein the machine visions sensors are mounted in recessed compartments in the container.

12. The tracking system of claim 8 wherein the machine vision sensors have a high dynamic range (HDR>120 dB), a high frame rate (FRS>100), a global shutter, and are a low cost image sensor.

13. The tracking system of claim 7 wherein the tracking device further comprises a motion sensor array having ten degrees of freedom.

14. The tracking system of claim 7 wherein the tracking device further comprises a battery, memory, and a motion sensor array having ten degrees of freedom, and a machine vision sensor.

15. A method of deactivating a tracking device associated with a container, comprising the steps of:
    (a) associating a wireless tracking device with the container;
    (b) associating at least one pair of machine vision sensors with the container and with the tracking device, the pair mounted on the container separate from the tracking device;
    (c) sensing with the pair of sensors a curvature associated with the surroundings of the container, wherein sensing the curvature comprises sensing a cargo hold curvature of a transportation vessel;
    (d) determining whether the container is in proximity to the curvature; and
    (e) deactivating the tracking device when the container is determined to be in proximity to the transportation vessel.

16. The method of claim 15 wherein the step of sensing curvature with the pair of sensors comprises sensing a cargo door curvature.

* * * * *